Jan. 4, 1966     L. M. ULLESTAD     3,227,366
MULTIPLE COUNTER ODOMETER ASSEMBLY FOR AUTOMOTIVE VEHICLES
Filed Sept. 6, 1963     2 Sheets-Sheet 1
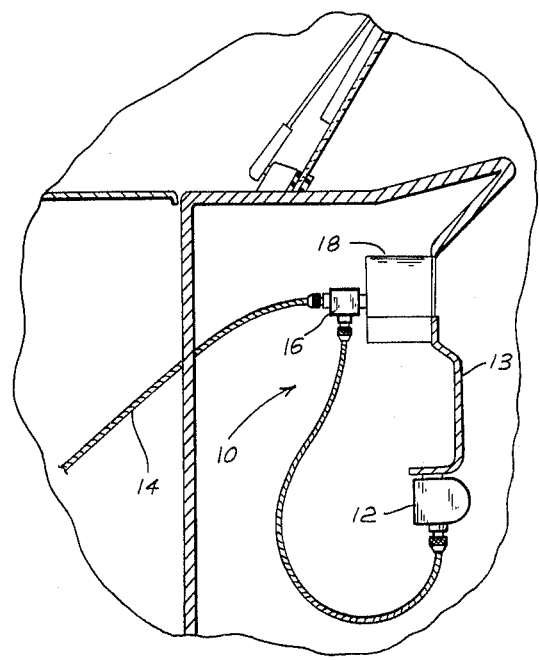
Fig. 1
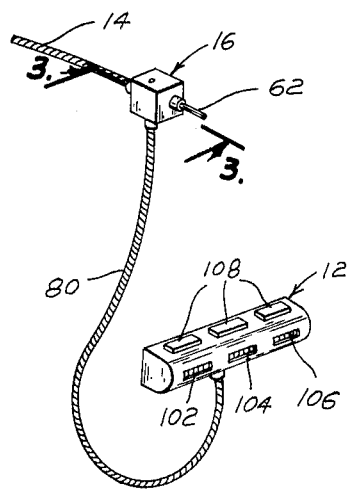
Fig. 2
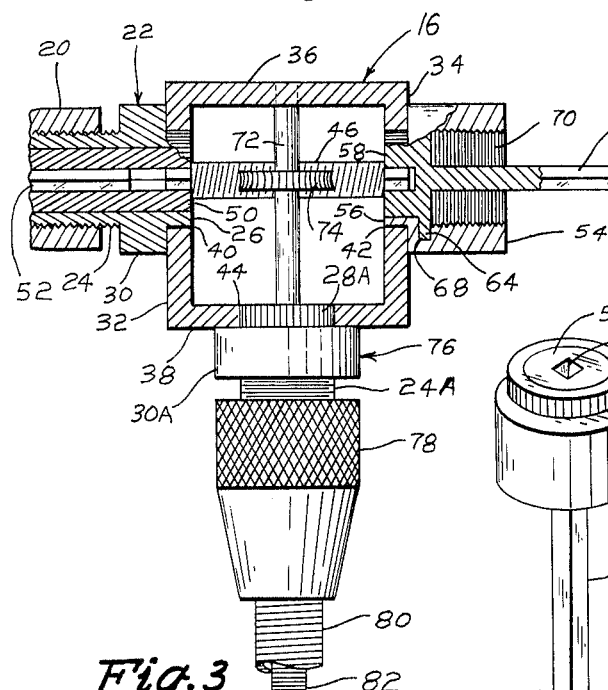
Fig. 3
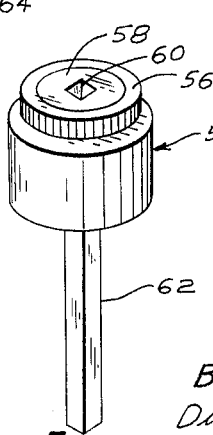
Fig. 4
Fig. 5
INVENTOR
LESTER M. ULLESTAD
BY
Dick + Zarley
ATTORNEYS INVENTOR
LESTER M. ULLESTAD
BY
Dick + Zarley
ATTORNEYS

United States Patent Office 3,227,366
Patented Jan. 4, 1966

3,227,366
MULTIPLE COUNTER ODOMETER ASSEMBLY
FOR AUTOMOTIVE VEHICLES
Lester M. Ullestad, 2208 Duff, Ames, Iowa
Filed Sept. 6, 1963, Ser. No. 307,079
9 Claims. (Cl. 235—97)

This invention relates to an odometer for an automotive vehicle and in particular to an odometer means adapted to operate independently of the speedometer and odometer provided on automobiles as original equipment.

Businessmen, vacationers, and others frequently find it desirable to maintain records of their automobile mileage. For example, businessmen for tax purposes must maintain records of the miles driven in connection with their business as distinguished from mileage resulting from the personal use of the automobile. Thus it is necessary to record the mileage for each business trip. Also it is important to know the number of miles driven in the automobile for each year since most business records are maintained on a yearly basis.

Therefore, it is an object of this invention to provide an automobile accessory for assisting in maintaining records of total miles driven, of the miles driven each year, and of the miles driven during a particular trip;

It is a further object of this invention to provide an automobile odometer accessory assembly having a plurality of counters for recording the total mileage, their yearly mileage, and the trip mileage;

It is a further object of this invention to provide an odometer assembly having counters which may be selectively engaged and disengaged to the speedometer cable;

It is a further object of this invention to provide an odometer assembly having a counter which may be readily reset to zero;

It is a further object of this invention to provide an odometer assembly which may be readily installed in any automobile;

It is a further object of this invention to provide an odometer assembly which will operate independently of the factory installed odometer and speedometer unit in all automobiles;

It is a further object of this invention to provide an odometer assembly having a counter unit which may be readily secured to the dashboard of an automobile; and A further object of this invention is to provide a multiple counter odometer assembly for automotive vehicles which is simple in design, economical to manufacture and refined in appearance.

This invention consists in the construction, arrangements, and combination, of the various parts of the device, whereby the objects contemplated are attained as hereinafter more fully set forth, specifically pointed out in the claims, and illustrated in the accompanying drawings, in which:

FIG. 1 is a fragmentary side elevation view of an automobile showing in particular the odometer assembly of this invention coupled to the conventional automobile speedometer cable;

FIG. 2 is a perspective view of the odometer assembly coupled to the automobile speedometer and odometer cable;

FIG. 3 is a cross-sectional elevation view taken along line 3—3 in FIG. 2 of the unit coupling the speedometer cable to the odometer assembly cable;

FIG. 4 is a perspective view of one of the adapters mounted in the coupling unit shown in FIG. 3;

FIG. 5 is a perspective view of a second adapter unit mounted in the coupling unit of FIG. 3 for connection to the factory equipped odometer and speedometer assembly in the automobile;

Figure 6:
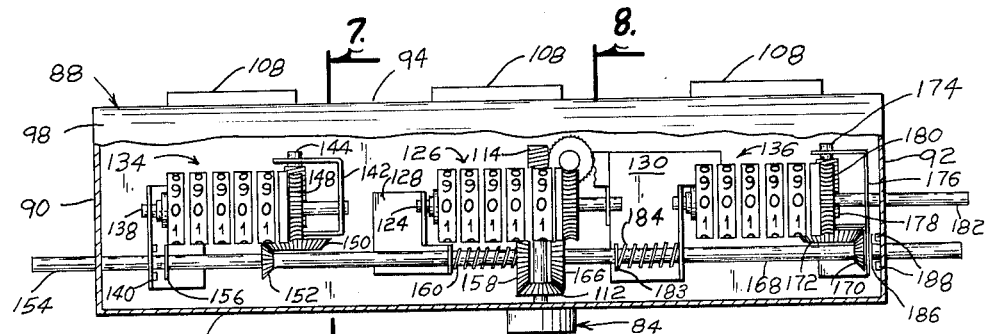
FIG. 6 is a side elevation fragmentary view of the odometer assembly with one side of the odometer housing cut away to illustrate more clearly the component parts and their relationship to each other within the odometer assembly.

The odometer assembly is referred to in FIG. 1 of the drawings by reference numeral 10 and is shown to comprise an odometer unit 12 secured to the lower side of a dashboard 13. A speedometer cable 14 connected to the transmission or the like of the automobile connected to a coupling unit 16 of the odometer assembly 10. The coupling unit 16 is inserted between the conventional speedometer cable 14 and the factory installed speedometer and odometer unit 18 mounted in the dashboard 13.

The conventional speedometer cable 14 is shown in FIG. 3 with an internally spreaded screw cap member 20 which threadably engages an adapter element 22 (FIG. 4). On one end of the adapter element 22 threads 24 are provided while on the opposite end 26 longitudinal serrations 28 are formed in the outer face thereof. Intermediate the threaded end 24 and the serrated end 26, an annular shoulder portion 30 is provided.

The coupling unit 16 comprises as shown in FIG. 3 a pair of end walls 32 and 34 which cooperate with a top wall 36 and a bottom wall 38 to form a completely enclosed square box-like unit. Aligned openings 40 and 42 are formed in each of the side walls 32 and 34 respectively. A third opening 44 is formed in the bottom wall 38. Extending between the side walls 32 and 34 and centered in the openings 40 and 42 is a worm 46 which is received in a square opening 48 extending longitudinally of an insert element 50 rotatably mounted within the adapter element 22 (FIG. 4). An elongated element 52 extending within the speedometer cable 14 and being square in cross-section extends into the opposite end of the rotatable element 50 from the worm 46. The shoulder 30 on the adapter 22 abuts against the outer face of the coupling unit 16 sidewall 32 while the end portion 26 is press fitted into the opening 40.

The other end of the worm 46 is positioned in the opening 42 in the side wall 34 and is engaged by a second adapter member 54. The adapter 54 is provided with a first end portion 56 which is press fitted into the opening 42 in the side wall 34. An insert 58 has a square center opening 60 formed longitudinally thereof in the outer end adjacent the end portion 56. Extending through the hollow adapter element 54 from the inside surface of the insert 58 is a square in cross-section element 62. Intermediate the ends of the insert element 58 is an annular flange 64 which is seated in an annular recess formed within the adapter element 54 to hold the insert element against longitudinal movement but permit rotational movement relative to the adapter element 54. In FIG. 3 it is seen that adapter element 54 has internal threads 70 which are adapted to engage the threaded male member extending rearwardly of the conventional speedometer unit 18.

A shaft member 72 extends between the top and bottom walls 36 and 38 respectively of the coupling unit 16 with the upper end portion of the shaft member rotatably mounted in the top wall 36. A worm gear 74 is fixedly mounted on the shaft element 72 for rotatable engagement with the worm 46. Another adapter member 76 identical to adapter member 22 is press fitted into the opening 44 in the bottom coupling unit wall 38. The lower end of the shaft 72 is square in cross-section and is received within the square opening in the insert element corresponding to insert element 50 in FIG. 4. The shoulder 30A abuts against the lower face of the wall 38. The screw threads 24A are in threaded engagement with the internal threads of a cap member 78 provided on the end of a cable housing 80. The cable housing 80 contains cable element 82 which extends to the odometer unit 12 where it is secured as shown in FIGS. 6 and 8 of the drawings.

Figure 7:
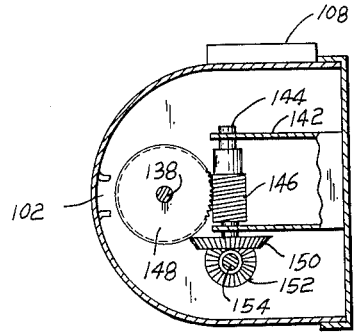
FIG. 7 is an elevation cross-sectional view taken along line 7—7 in FIG. 6 of the odometer assembly.

Another adapter element 84 similar to the adapter element 22 shown in FIG. 4, is secured to the bottom wall 86 of the housing 88 of the odometer unit 12. The housing 88 is completely enclosed by a pair of end walls 90 and 92, a top wall 94 integral with a front semi circular elongated wall 98 which is also integral with the bottom wall 86. A rear wall 100 is provided which is channel shaped in cross-section and fits over the outside of the top and bottom walls 94 and 86. As shown in FIGS. 2 and 7, three windows 102, 104 and 106 are formed in the front semi circular wall 98. On the top wall 94 three magnet elements 108 are provided for securing the odometer unit 12 to any metallic member in the automobile such as the dash 13 as shown in FIG. 1.

Mechanical power is transmitted to the odometer unit 12 through an element 110 which is square in cross-section at it slower end which is received in the square opening formed in the insert element in the adapter member 84. Adjacent the lower wall 86, a bevelled gear 112 is mounted on the shaft element 110 and adjacent the upper wall 94 a worm 114 is provided on the shaft element 110.

Figure 8:
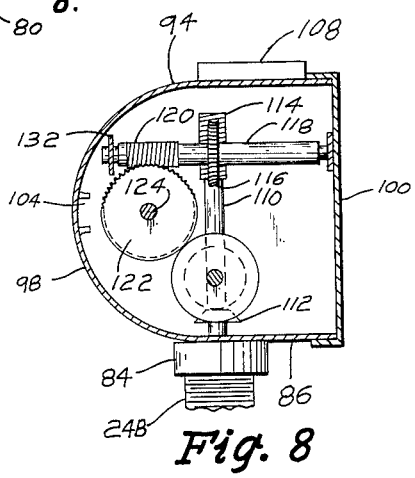
FIG. 8 is another elevation cross-sectional view taken along line 8—8 in FIG. 6 of the odometer assembly.

The worm 114, as shown in FIG. 8, drives a worm gear 116 mounted on a shaft 118 which has one end rotatably mounted on the rear wall 100 of the housing 88. The other end of the shaft 118 adjacent the front wall 98 is provided with a worm 120 which is in engagement with a worm gear 122 carried by a shaft 124 extending through a counter 126 positioned adjacent the center window 104. The shaft 124 is rotatably mounted at its ends by upstanding bracket elements 128 and 130. To give support to the shaft 118 adjacent the counter 126, a bearing bracket 132 is secured to the forward semi circular wall 98 (FIG. 8). As can be readily understood from viewing FIG. 6 of the drawings, counter 126 will be in continuous operation as long as power is being supplied to the unit 12 through the shaft 110.

Figure 9:
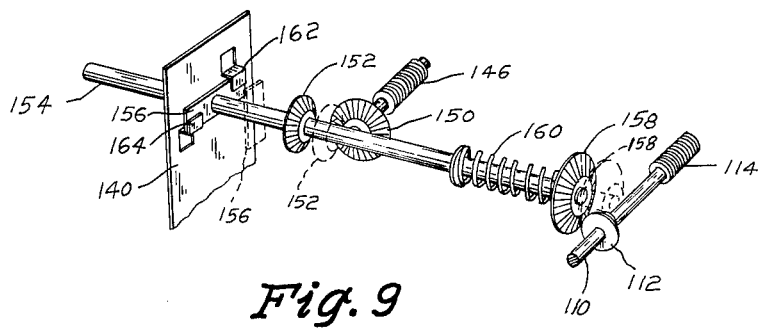
FIG. 9 is a perspective view of only the power transmission components for one counter and further showing the manner in which the counter may be engaged and disengaged to the counter and the drive shaft connected to the automobile speedometer cable.

On opposite ends of the counter 126, counters 134 and 136 are provided adjacent windows 102 and 106 respectively. With respect to counter 134 it is seen in FIG. 6 that it is provided with a shaft 138 which is rotatably mounted at its opposite ends by brackets 140 and 142. As shown in FIG. 7, bracket 142 is U-shaped and has a shaft 144 extending through and between its outer ends. Intermediate the legs of the bracket 142 is provided a worm 146 which is in engagement with a worm gear 148. On the lower end of the shaft 144 is provided a bevel gear 150 which is adapted to be engaged at times with a bevel gear 152 carried on a shaft 154. The shaft 154 extends through the housing 88 end wall 90 and is supported by the bracket 140 and also the counter bracket 128 supporting counter 126. A stop element 156 is provided adjacent the bracket 140 on the shaft 154 to limit longitudinal movement of the shaft member 154. Adjacent the bevel gear 112, a bevel gear 158 is provided on the end of the shaft 154 for engagement therewith. A spring 160 is positioned between the inner face of the bevel 158 and the portion of the bracket 128 supporting the shaft 154. This spring 160 normally urges the bevel gear 158 into engagement with the bevel gear 112. By pulling the shaft 154 to the left as viewed in FIG. 6 against the action of the spring 160 each of the bevel gears 152 and 158 will be disengaged from their adjacent bevel gears 150 and 112 respectively thereby taking counter 134 out of operation. Then, by rotation of the shaft 154 as shown in FIG. 9, the stop element 156 may be moved into locking engagement with tabs 162 and 164 formed out of the supporting bracket 140. The dash lines in FIG. 9 illustrate the relationship of the parts when the respective adjacent gears are in engagement with each other for transmission of mechanical energy to the counter 134.

If desired, by removal of the rear channel wall 100, access to the shaft 138 may be obtained for resetting the counter 134. Ordinarily it is not intended that this counter be reset except at the end of each year.

The bevel gear 112 also drives a bevel gear 166 as shown in FIG. 6 which is connected to a shaft 168 rotatably mounted on the support bracket 130 and the housing end wall 92. A bevel gear 170 is provided on the shaft 168 for driving engagement with a bevel gear 172 which in turn is affixed to the end of a shaft 174 extending through and between the upstanding legs of a bracket 176. Intermediate the legs of the bracket 176 is a worm 178 which drives a worm gear 180 mounted on a shaft 182 extending through the counter 136. The counter 136 is supported on the shaft at its inner end by an upstanding portion of support bracket 130 and on its outer end by the end wall 92 through which the shaft extends outwardly of the housing 88. The portion of the shaft 182 exposed through the housing 88 may be manually operated to reset the counter 136. Similar to the shaft 154 which drives the counter 134, the shaft 168 carries a spring 184 positioned between a stop means 183 fixedly mounted on the shaft 168 and the counter supporting bracket 130 whereby the bevel gears 166 and 170 are yieldingly held in engagement with the bevel gears 112 and 172 respectively for operating the counter 136. Furthermore, an element 186 is fixedly secured to the shaft 168 for engagement with tabs 188 when the shaft 168 is rotated in a similar manner as the shaft 154 as illustrated in FIG. 9 of the drawings.

Thus it is seen that in operation, the odometer assembly 10 of this invention may be readily installed in any automobile having a conventional speedometer cable assembly 14 as shown in FIG. 1. It is merely necessary to remove the end cap on the cable 14 from the conventional speedometer unit 18 and thread it onto the adapter 22 as shown in FIG. 3 of the drawings. The adapter 54 on the opposite side of the coupling unit 16 is then secured to the conventional speedometer assembly 18. The auxiliary odometer unit 12 may then be located in any convenient position on the dashboard 13 of the automobile.

In the auxiliary odometer unit 12, the counter 134 may be considered a yearly counter, the counter 126 a perpetual counter and the counter 136 a trip counter. Since it is frequently desirable to know the total mileage driven during any one year the yearly counter 134 has not been provided with a reset shaft 138 which is accessible from the outside of the housing 88, but instead the rear wall 100 must be removed to gain access to the shaft 138 for resetting the counter. There is however considerable flexibility associated with the counter 134, since if desired it may be disengaged by the pulling of the shaft 154 outwardly of the housing and rotating the element 156 into engagement with the tab elements 162 and 164 as shown in FIG. 9. Moreover the counter 134 may be allowed to operate continuously as a perpetual counter.

Regardless of whether counters 134 or 136 are in operation or have been reset, counter 126 will operate continuously although it can be reset by removal of the back 100 and rotating the shaft 124 in a reverse direction of its normal rotation. The trip counter 136 has the greatest flexibility of all three of the counters. It may be engaged and disengaged from operation by manual operation of the shaft 168 in the manner described regarding shaft 154 associated with counter 134. Furthermore, the reset shaft 182 extends outwardly of the housing 88 and may be manually operated at any desired time such as at the end of a trip.

It is to be further noted that when the counters 134 and 136 are taken out of operation, it is not only the counter shafts 138 and 182 respectively that are quiet, but all moving parts other than those required to operate the perpetual counter 126 since the bevelled gears 158 and 166 are out of engagement with the bevel gear 112 as shown in FIG. 6 of the drawings.

From a consideration of the foregoing disclosure, it will be obvious that all of the initially recited objects of the present invention have been achieved.

Some changes may be made in the construction and arrangement of my Multiple Counter Odometer Assembly for Automotive Vehicles without departing from the real spirit and purpose of my invention, and it is my intention to cover by my claims, any modified forms of structure or use of mechanical equivalents which may be reasonably included within their scope.

I claim:

1. An odometer assembly for an automobile having a speedometer cable means adapted to be operatively connected to the automobile drive shaft, comprising, a second cable means;

a coupling means for connecting said second cable means to the automobile cable means;

an elongated hollow housing member adapted to be secured to the automobile in the passenger compartment and the free end of said second cable means extending into said housing member, said housing having a side wall with three longitudinally aligned window openings formed therein;

a perpetual counter positioned in said housing in continuous operative engagement with said second cable means to record all miles travelled by said automobile, said counter being positioned adjacent the center window with its reading visible therethrough;

a yearly mileage counter in said compartment adjacent a second of said windows with its mileage reading visible therethrough;

power transmission means yieldably coupling said second cable and said yearly mileage counter;

manually operable means extending longitudinally out the adjacent end of said housing, said means longitudinally movable of said housing for engaging and disengaging said power transmission means to said second cable;

means for holding said power transmission means out of engagement with said yearly mileage counter and said second cable means;

a trip mileage counter in said compartment adjacent the third of said windows with its mileage reading visible therethrough;

power transmission means yieldably coupling said second cable and said trip mileage counter;

means for engaging and disengaging said trip mileage counter power transmission means to said second cable;

manually operable means extending longitudinally out the adjacent end of said housing, said means longitudinally movable of said housing for holding said power transmission means out of engagement with said trip mileage counter and said second cable means; and means connected to said trip mileage counter and extending outside of said housing for manually resetting of the counter.

2. The structure of claim 1 and means completely enclosed by said housing for resetting said yearly mileage counter.

3. The structure of claim 1 and means completely enclosed by said housing for resetting said yearly mileage counter, and magnet means provided on the top of said housing for securing said assembly to the bottom of the dashboard of said automobile.

4. In combination, an odometer assembly for an automobile having a speedometer and odometer, and a speedometer cable means operatively connected to the automobile drive shaft, comprising, a second cable means;

a coupling means for connecting said second cable means to the automobile cable means, said coupling means coupled to said automobile speedometer and odometer for operation of the same;

an elongated hollow housing member secured to the automobile in the passenger compartment and the free end of said second cable means extending into said housing member, said housing having a side wall with three longitudinally aligned window openings formed therein;

a perpetual counter positioned in said housing in continuous operative engagement with said second cable means to record all miles travelled by said automobile, said counter being positioned adjacent the center window with its reading visible therethrough;

a yearly mileage counter in said compartment adjacent a second of said windows with its mileage reading visible therethrough;

power transmission means yieldably coupling said second cable and said yearly mileage counter;

manually operable means extending longitudinally out the adjacent end of said housing, said means longitudinally movable of said housing for engaging and disengaging said power transmission means to said second cable;

means for holding said power transmission means out of engagement with said yearly mileage counter and said second cable means;

a trip mileage counter in said compartment adjacent the third of said windows with its mileage reading visible therethrough;

power transmission means yieldably coupling said second cable and said trip mileage counter;

means for engaging and disengaging said trip mileage counter power transmission means to said second cable;

manually operable means extending longitudinally out the adjacent end of said housing, said means longitudinally movable of said housing for holding said power transmission means out of engagement with said trip mileage counter and said second cable means;

means connected to said trip mileage counter and extending outside of said housing for manually resetting of the counter;

means completely enclosed by said housing for resetting said yearly mileage counter; and means provided on the top of said housing for securing said assembly to the dash board of said automobile.

5. An odometer assembly for an automobile having a speedometer and an odometer means and a speedometer cable means adapted to be operatively connected to the automobile drive shaft, comprising, a second cable means including a housing and a cable element;

a coupling means for connecting said cable element to said automobile cable means, said coupling means adapted to be coupled to said automobile speedometer and odometer for operation of the same, a hollow elongated enclosed housing adapted to be secured to the automobile in the passenger compartment, said housing having a side wall with three longitudinally aligned window openings formed therein;

a first shaft operatively connected to said cable element and extending upwardly through the lower wall of said housing intermediate the housing end walls;

a bevel gear mounted on said shaft adjacent said bottom wall;

a worm formed on the upper end of said shaft;

a second shaft extending horizontally and transversely of said housing;

a worm gear mounted on said second shaft for engagement with said worm on said first shaft;

a second worm formed on said second shaft;

a perpetual counter adapted to be viewed through the center window and having a longitudinal shaft extending longitudinally of said housing and having a worm gear mounted thereon for engagement with said worm on said second shaft to continuously operate said counter during operation of said automobile cable means;

a pair of rotatable drive shafts extending parallel and in opposite directions from said bevel gear on said first shaft, each of said drive shafts having a first bevel gear adapted to engage said bevel gear on said first shaft and a second bevel gear spaced from said first bevel gear;

a yearly counter positioned in said housing and adapted to be viewed through a second of said windows, said counter having a shaft extending longitudinally of said housing and having a worm gear on one end thereof;

a first vertical shaft positioned adjacent said last mentioned worm gear and having a worm formed thereon for engagement therewith, the lower end of said vertical shaft having a bevel gear adapted to engage said second gear on the adjacent drive shaft for operating said yearly counter;

a trip counter positioned in said housing and adapted to be viewed through said third window, said counter having a shaft extending longitudinally of said housing and having a worm gear on one end thereof; and a second vertical shaft positioned adjacent said trip counter worm gear and having a worm formed thereon for engagement therewith, the lower end of said second vertical shaft having a bevel gear adapted to engage said second gear on the adjacent drive shaft for operating said trip counter.

6. The structure of claim 5 wherein one of said drive shafts may be moved longitudinally of said housing for disengaging the first bevel gear on said drive shaft from said bevel gear on said first shaft whereby the associated counter will be taken out of operation.

7. The structure of claim 5 wherein one of said drive shafts may be moved longitudinally of said housing for disengaging the first bevel gear on said drive shaft from said bevel gear on said first shaft whereby the associated counter will be taken out of operation, and spring means on said drive shaft for normally urging said first bevel gear into engagement with said bevel gear on said first shaft.

8. The structure of claim 5 wherein one of said drive shafts may be moved longitudinally of said housing for disengaging the first bevel gear on said drive shaft from said bevel gear on said first shaft whereby the associated counter will be taken out of operation, and spring means on said drive shaft for normally urging said first bevel gear into engagement with said bevel gear on said first shaft, said drive shaft having its end opposite said first bevel gear extending through the adjacent housing end wall for manual operation thereof.

9. The structure of claim 5 wherein one of said drive shafts may be moved longitudinally of said housing for disengaging the first bevel gear on said drive shaft from said bevel gear on said first shaft whereby the associated counter will be taken out of operation, and spring means on said drive shaft for normally urging said first bevel gear into engagement with said bevel gear on said first shaft, said drive shaft having its end opposite said first bevel gear extending through the adjacent housing end wall for manual operation thereof, said one drive shaft being the drive shaft adjacent said trip counter and said trip counter shaft extending through the housing end wall for resetting said trip counter.

References Cited by the Examiner
UNITED STATES PATENTS

| | | | |
|---|---|---|---|
| 1,319,205 | 10/1919 | Carson | 235—97 |
| 1,330,869 | 2/1920 | Harter | 235—96 |
| 1,593,637 | 7/1926 | Miller | 235—91 |
| 2,159,915 | 5/1939 | Van Wagenen | 235—91 X |

LEO SMILOW, *Primary Examiner.*

LEYLAND M. MARTIN, *Examiner.*